United States Patent [19]

Codling

[11] 4,120,918

[45] Oct. 17, 1978

[54] TAMPER PROOF IDLE ADJUSTING SCREWS

[75] Inventor: Daryl O. Codling, Rochester, Mich.

[73] Assignee: Colt Industries Operating Corp., New York, N.Y.

[21] Appl. No.: 796,990

[22] Filed: May 16, 1977

[51] Int. Cl.² ................................. F02M 3/08
[52] U.S. Cl. .................... 261/41 D; 137/384; 261/71; 261/DIG. 38
[58] Field of Search .......... 261/DIG. 38, 41 D, 71; 137/384; 217/110; 220/307, 233, 234, 235

[56] References Cited

U.S. PATENT DOCUMENTS

| 220,773 | 10/1879 | Stewart | 217/110 |
|---|---|---|---|
| 2,033,371 | 3/1936 | Benaggio | 137/384 |
| 2,886,203 | 5/1959 | Goll | 217/110 |
| 3,028,036 | 4/1962 | Goll | 217/110 |
| 3,321,195 | 5/1967 | Korte | 261/DIG. 38 |
| 3,429,330 | 2/1969 | Bogossian et al. | 137/223 |
| 3,454,264 | 7/1969 | Sarto | 261/41 D |
| 3,661,291 | 5/1972 | Hetzer | 220/307 |
| 3,966,080 | 6/1976 | Bittel | 220/307 |

FOREIGN PATENT DOCUMENTS

| 702,215 | 2/1941 | Fed. Rep. of Germany | 261/41 D |
|---|---|---|---|
| 2,401,803 | 9/1974 | Fed. Rep. of Germany | 261/DIG. 38 |
| 1,247,331 | 9/1971 | United Kingdom | 217/110 |

OTHER PUBLICATIONS

"Controlling Exhaust Emissions", Ethyl Corp., pp. 1–8, pub. 2-68.

*Primary Examiner*—Tim R. Miles
*Attorney, Agent, or Firm*—Walter Potoroka, Sr.

[57] ABSTRACT

A fuel metering apparatus, for supplying metered fuel to an associated combustion engine, has an idle fuel metering and supply system comprising adjustable valving means which, in turn, comprises a discharge orifice means and cooperating valving member which is adjustably selectively positioned with respect to such orifice means in order to thereby establish a desired metered rate of fuel flow through the thusly determined effective flow area of the orifice means for a particular pressure differential thereacross; the adjustable valving member is generally contained within a cooperating body member or portion and access to the valving member, subsequent to it being selectively positioned, is prevented by closure members placed in position after the said selective positioning of said valving member.

14 Claims, 9 Drawing Figures

TAMPER PROOF IDLE ADJUSTING SCREWS

BACKGROUND OF THE INVENTION

Although the industry has made significant improvements in the field of fuel metering various levels of government have, nevertheless, unilaterally established strict limits on vehicular engine exhaust emissions such as, for example, oxides of nitrogen, unburned hydrocarbons and carbon monoxide. There are, obviously, many influencing factors collectively determining the degree of such exhaust emissions from any particular vehicle and engine. For example, engine spark timing, mode of engine operation (whether hot or cold and whether accelerating or decelerating), fuel metering head in the fuel bowl, degree of pressure drop across air intake filter, and the general condition of the engine intake and exhaust valves are just some of the variables which will determine the degree of exhaust emission. The prior art has suggested various means, methods and apparatus for reducing exhaust emissions due to the aforementioned factors. However, even with the adoption of such proposals by the prior art, it has been found that problems still existed with regard to meeting such governmentally imposed limits of exhaust emissions.

It has now been discovered that there is another factor which can lead to increased exhaust emission regardless of how precisely or carefully the engine components are manufactured and regardless of how carefully and precisely the carburetor or other fuel metering device, to be used with such an engine, are manufactured and calibrated.

Such an additional factor is the unauthorized tampering with certain of the metering restrictions (which were precisely determined during manufacture) by individuals, after the carburetor or other fuel metering device has been sold and placed into actual use. Such individuals were found to often "adjust" the carburetor or other fuel metering device in order to obtain what they considered "better" engine performance.

This usually meant that they tried to obtain a richer (more) fuel flow to the engine than that as established by the engine and/or carburetor and/or fuel control manufacturer. The system within, for example, the carburetor which could be most easily manipulated by such individuals is the idle fuel system since it possessed an adjustable needle valve generally in the idle fuel discharge port.

The elimination of such adjustable needle valves would, in turn, create serious difficulties in attempting to properly calibrate the carburetor during its manufacture and, attendantly, greatly increase the cost thereof.

Accordingly, the invention as herein disclosed and claimed is primarily directed to the solution of the problems arising relative to and out of such adjustable needle-type valves as well as other related and attendant problems.

SUMMARY OF THE INVENTION

According to the invention, a fuel system for metering fuel to an associated engine and which comprises a needle valve cooperating with a discharge passage for thereby metering the rate of fuel flow through such discharge passage to said engine has body means defining the discharge passage as well as supporting said needle valve, and cover-like capping means are provided to preclude access to the needle-valve once such needle valve is selectively adjusted relative to the cooperating discharge passage.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may have been eliminated from one or more views.

DETAILED DESCRIPTION OF THE PREFERRED EMBODIMENTS

Figure 1:
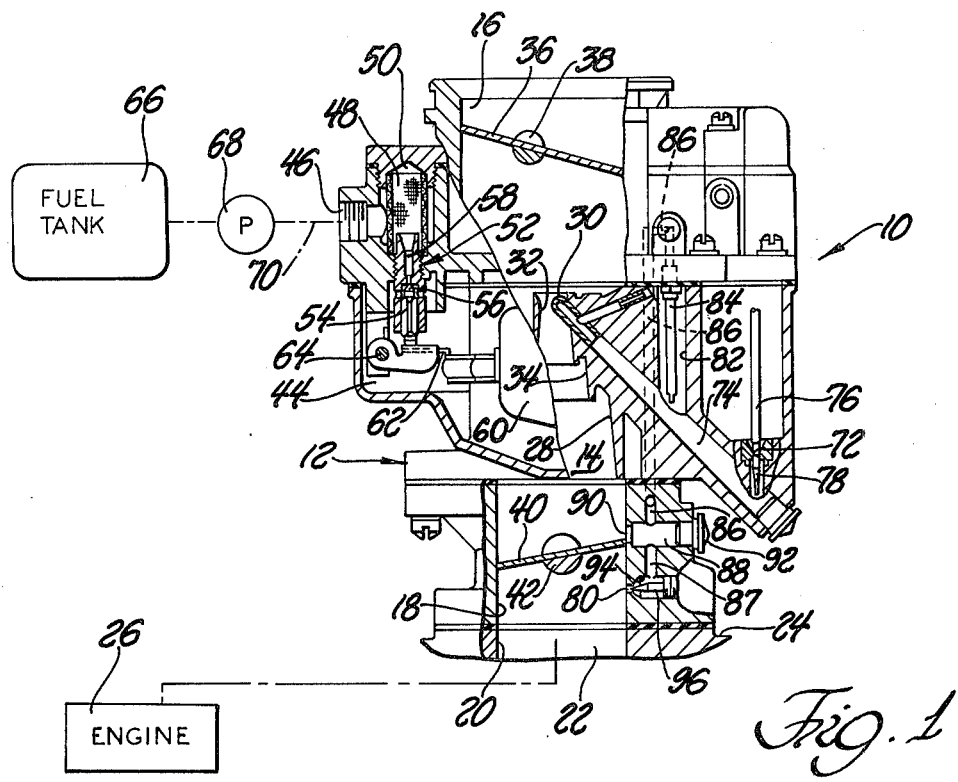
FIG. 1 is a side elevational view illustrating a fuel control or metering apparatus, such as a carburetor, with ports thereof broken away and in cross-section, embodying teachings of the invention.

Referring now in greater detail to the drawings, FIG. 1 illustrates a carburetor 10 having body means 12 through which is formed induction passage means 14 with an air inlet end 16 and a discharge end 18 which communicates with the inlet 20 of the intake passage means 22 of an associated inlet or intake manifold 24 of a related combustion engine 26. The induction passage means 14 may comprise venturi means 28 generally within which a main fuel discharge nozzle 30, comprising booster - like venturi means 32 and 34, is situated.

A choke valve 36, operable to regulate intake air flow, is suitably rotatably mounted on and to a choke shaft 38 suitably rotatably journalled in body means 12. Somewhat similarly a throttle valve 40 is located generally in the discharge end of induction passage means 14 and suitably fixedly secured to a transversely extending rotatable throttle shaft 42 as to be thereby variably selectively positionable with the induction passage means as to accordingly control the flow of motive or combustible fluid from the fuel metering means 10 and into the intake passage means 22.

The body means 12 may be provided with a fuel bowl or reservoir 44 having a fuel inlet 46 provided as with a screen 48 situated within an inlet recess 50. Fuel inlet valving means 52 comprises a needle-like valve member 54 having a tapered end 56 in displaceable contact with a cooperating valve seat of a valve body structure 58. A float member 60 having a float arm 62, pivotally mounted as at 64, is operatively connected to needle valve 54 as to thereby be effective for actuating needle valve 54 and maintain a generally constant fuel level within the fuel reservoir 44. Fuel may be supplied to the reservoir 44 as from a related fuel tank 66 and associated fuel pump means 68 situated in, as for example, interconnecting conduit means 70.

A fuel metering orifice 72 leads from the fuel bowl or reservoir 44 to an upwardly inclined main fuel passage 74 which terminates in the main fuel discharge nozzle 30 discharging as into the primary booster venturi 32. Fuel flow from the reservoir 44 through orifice 72 into fuel passage 74 is controlled as by an associated metering rod 76 having a stepped or otherwise contoured end 78 positioned in the orifice 72 as to cooperate therewith in defining a variably selected effective metering area. Axial movement of rod 76 to position different portions of contoured end 78 in orifice 72 provides a change in the rate of metered fuel flow through such orifice means 72.

The carburetor or charge forming device 10 also comprises an idle fuel metering and supply system which may comprise idle fuel dishcarge port means 80 opening and discharging into induction passage means 14 downstream or posterior to throttle valve means 40. The idle system may also comprise an idle fuel well 82 communicating with an extending generally upwardly from the main fuel passage 74. The well 82 may generally surround a metering tube 84 which, as at its upper end, communicates with passage or conduit means 86. As shown, the idle conduit means 86 may communicate first with a chamber 88 and from there with idle port or passage 80 as by a conduit portion 87. Chamber 88, in turn, is placed in communication with the induction passage means 14 as by aperture or slot means 90 situated generally upstream of the throttle valve 40, when closed, as to thereby become progressively opened to communication with the downstream portion of the induction passage means 14 as throttle valve 40 is progressively opened from its curb idle condition. After formation of chamber 88, the outer end thereof may be closed or sealed as by suitable access-like closure means 92. As can be seen in FIG. 1, idle fuel passage 87 extends downwardly as to communicate with discharge conduit or aperture means 80 through an intermediate chamber — like portion 94 which, in turn, generally encompasses an adjustable valve member 96.

Figure 2:
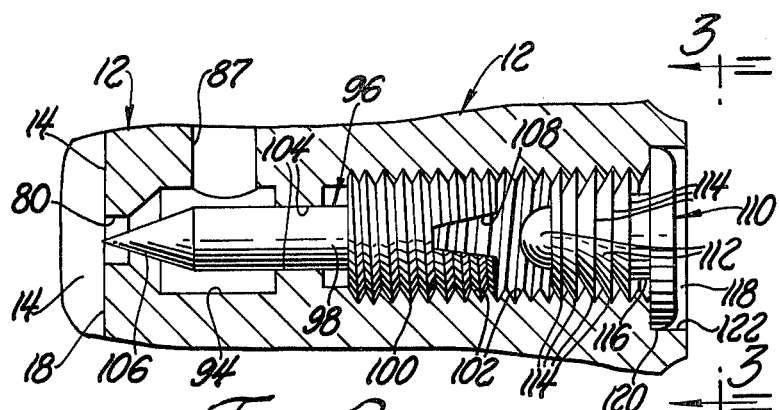
FIG. 2 is an enlarged axial cross-sectional view of a portion of the structure shown in FIG. 1.
Figure 3:
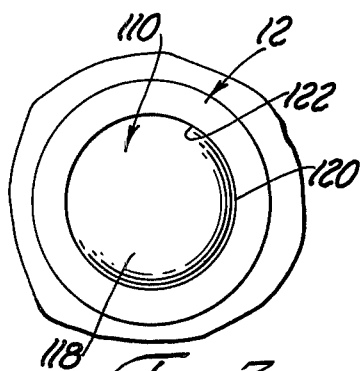
FIG. 3 is an end elevational view taken generally on the plane of line 3—3 of FIG. 2 and looking in the direction of the arrows.

Referring in greater detail in FIGS. 2 and 3, valve member 96 may comprise a shank-like body portion 98 which has an enlarged externally threaded portion 100 threadably engaging an internally threaded portion 102 carried as within body or housing means 12. If desired, cooperating internal slidable guide means 104 may be provided for effectively guiding the shank portion 98 and the contoured valving surface 106 carried at the end thereof and effective for cooperating with discharge orifice means 80 for establishing a desired effective metering flow area therethrough.

Preferably, the needle or valve member 96 is provided with a split slot 108 which is effective for operatively engaging the blade of a cooperating screw — driver or some other functionally equivalent tool whereby the member 96 may be threadably rotated as to thereby result in valving surface 106 being adjustably located at the desired position relative to orifice means 80. Further, in the preferred arrangement, the body portion, carrying the external threaded portion 100, in the general axial vicinity of the slot 108, is somewhat radially outwardly deformed in its free state to thereby result in some degree of frictional binding in order to assure that once the position of the valve member is adjustable selected that such position will be subsequently maintained.

A plug and cap member 110 is also inserted into the threaded hole 102. In the preferred embodiment, the member 110 comprises a main body portion 112 carrying a plurality of integrally formed annular flange or fin-like portions 114 somewhat axially spaced from each other along the body 112. A generally reduced neck-like portion 116 serves to interconnect the body 112 to a head portion 118 which, preferably, has an outer diameter 120 closely received within a recess or bore 122 formed in body means 12. In the preferred arrangement, member 110 is formed of somewhat resiliently deflectable plastic material as to result in the annular fines or retaining means 114 being relatively flexible thereby, because of the configurration of such retaining means 114, enabling the member 110 to be manually inserted into the threaded hole 102, and seated as generally depicted, while thereafter preventing manual withdrawal of such member 110. As can be seen, the retaining means 114 will deflect generally towards the axis while being inserted; and once thusly inserted, the retaining means 114 operatively engage the internally situated thread 102. Upon attempting withdrawal of the member 110, the fins or retaining means tend to deflect or to effectively move or expand radially outwardly thereby further engaging the threaded means 102 and preventing withdrawal of the member 110. Accordingly, it can be seen that once valve member 96 is properly adjusted and the closure member 110 is placed as generally depicted, the valve member 96 becomes totally enclosed and cannot be tampered with thereby assuring that the metering calibration established by the valving member 96 and as set by the manufacturer will be maintained.

Figure 4:
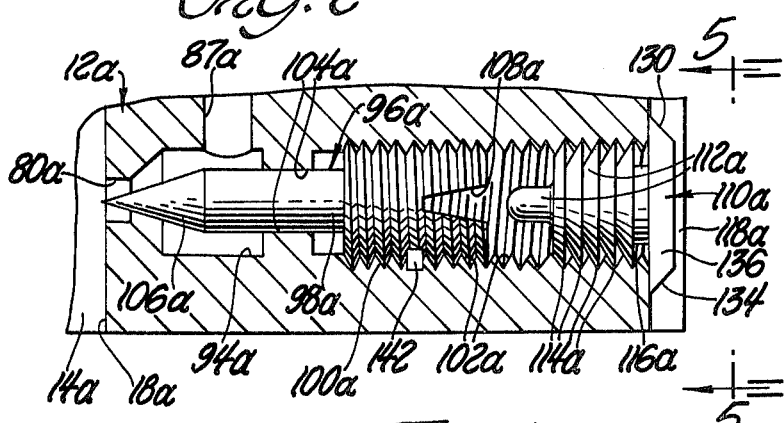
FIG. 4 is a view similar to that of FIG. 2 but illustrating a second embodiment of such structure.
Figure 5:
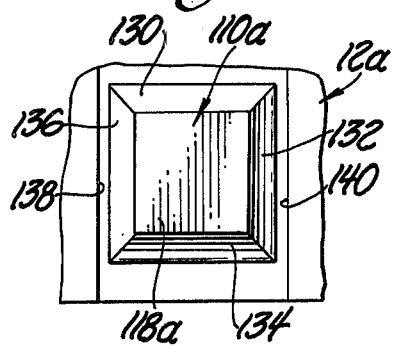
FIG. 5 is an end elevational view taken generally on the plane of line 5—5 of FIG. 4 and looking in the direction of the arrows.

In FIG. 4 and 5, all elements which are like or similar to those of the preceding figures are identified with like reference numbers provided with a suffix "a".

Referring in greater detail to FIGS. 4 and 5, it can be seen that the head 118a is generally rectilinear instead of circular as head 118 of FIGS. 2 and 3. Head 118a is provided with a plurality of flatted sides 130, 132, 134 and 136 which may be inclined generally toward each other as best depicted in FIG. 4. Also, in such an arrangement it is preferred that cooperating slotted-like constraining side walls 138 and 140 be formed in or carried by body means 12a as to closely receive the head 110a therebetween. Further, if desired, suitable retaining or locking means 142, as a cylindrical plastic plug carried within a cooperating seating recess formed in the threaded body of member 96a, may be provided for causing a somewhat resilient interference with the internally threaded portion 102a to thereby maintain valve member 96a in its selected position.

Figure 6:
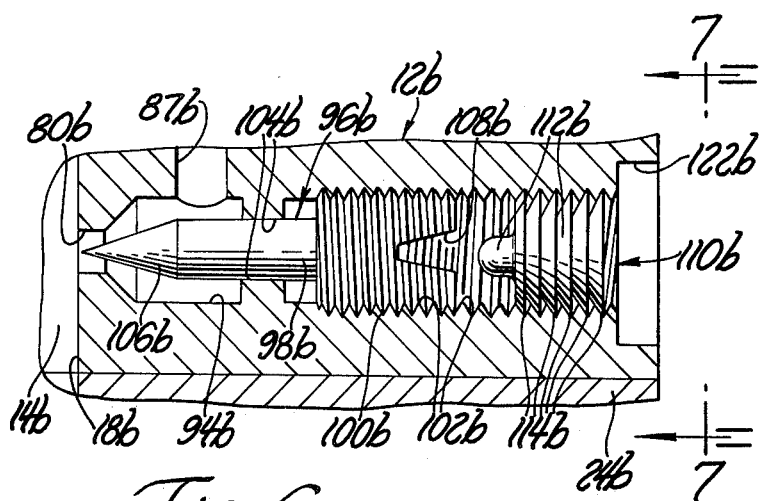
FIG. 6 is a view similar to that of FIGS. 2 and 4 and illustrating a still further modification of such structure.
Figure 7:
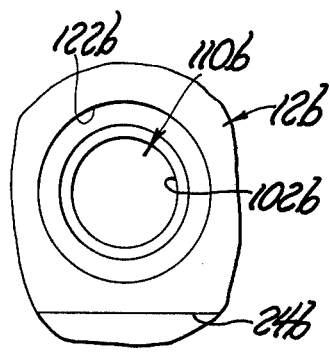
FIG. 7 is an end elevational view taken generally on the plane of line 7—7 of FIG. 6 and looking in the direction of the arrows.

In FIGS. 6 and 7 all elements which are like or similar to the preceding figures are identified with like reference numbers provided with a suffix "b". Referring in greater detail to FIGS. 6 and 7 it can be seen that in such an embodiment, closure member 110b, unlike members 110 and 110a, does not have either a neck portion or head portion equivalent to, for example, 116 and 118 of FIG. 2. In the embodiment of FIG. 6 the body 112b of member 110b is pushed sufficiently into the internally threaded hole 102b as to present no portion of such member 110b extending outwardly therefrom.

Figure 8:
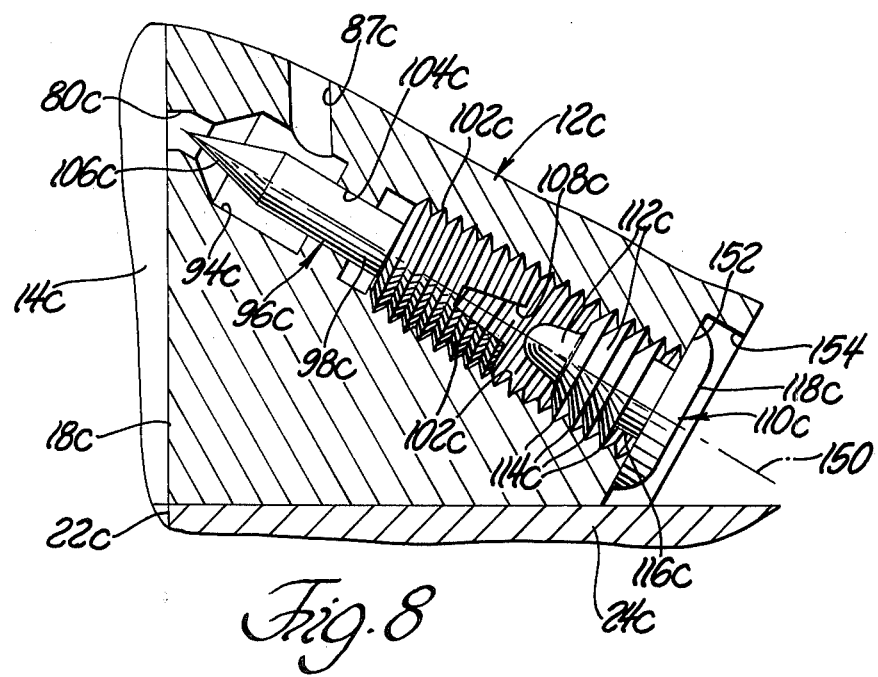
FIG. 8 is a view somewhat similar to that of FIG. 2, 4 and 6 and illustrating another embodiment of the invention.

In FIG. 8 all elements which are like or similar to the preceding Figures are identified with like reference numbers provided with a suffix "c". Referring in greater detail to FIG. 8, it can be seen that for all practical purposes the elements shown therein correspond to those of, for example, FIG. 2; the main difference is that in the arrangement of FIG. 8 the elements thereof are so inclined as to have the axis 150 thereof at a substantial angle inclined with respect to, for example, the intake manifold 24c. Further, a recess 152, for receiving the head 118c, is formed in such a manner as to provide for a generally projecting covering or overhead portion 154. Accordingly, by thusly inclining the axis of the needle valve member 96c any attempt to remove the capping or closure member 100c is made even more difficult because the path for removal of such closure member 110c intersects the surface of adjoining structure, which, in this case by way of example, is the induction manifold 24c. However, it has been discovered that any time the required path of travel for removal of such closure member 110c is downward, such attempted removal is made even more difficult.

Figure 9:
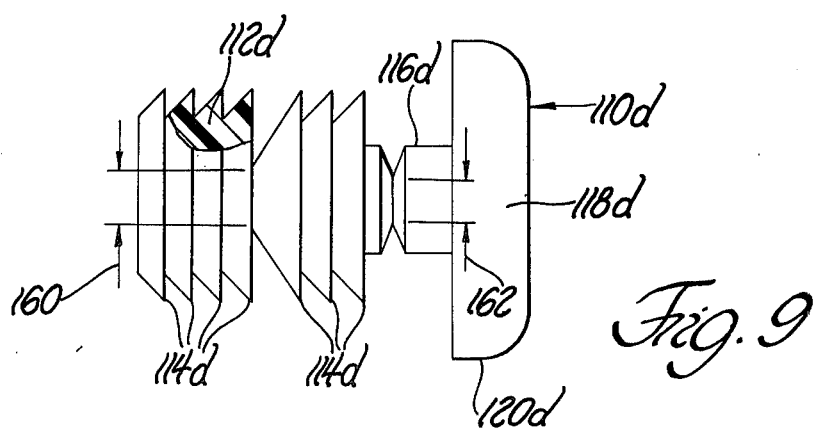
FIG. 9 is an enlarged side elevational view of still another embodiment, with portions thereof broken away and in cross-section, of one of the elements shown in the preceding Figures.

FIG. 9 illustrates various means by which a closure or capping member 110d can be made to have localized stress points for resulting in a shearing or controlled structural failure thereof when removal of the member 110d is attempted as from any of the assembled conditions shown in FIGS. 2-8. All elements in FIG. 9 which are like or similar to those of the preceding Figures are identified with like reference numbers provided with a suffix "d". Referring to FIG. 9 it can be seen that, for example, two of the annular fins or annular retainers 114d are effectively axially spaced further from each other as to have the body portion 112d therebetween reduced in cross-sectional area to, for example, a relatively small diameter 160 which would have a shear and tensil strength significantly less than the remaining portion of the body 112d. Also, the neck portion 116d may be provided with a reduced or stress localizing portion, as depicted for example, by the diametral dimension at 162, which may define an area providing even less shear and tensile strength than that at 160. Accordingly, it can be seen that if, for example, a closure means were constructed to have such a plurality of stress or shear points and such closure means was then inserted into a hole as depicted in any of FIGS. 2, 4, 6 or 8, and further assuming that someone somehow succeeded in grasping the head portion 118d to withdraw the closure member, when sufficient force was applied neck 116d would fail before the body portion 112d was withdrawn. If then an attempt was made to somehow grasp the rearward (right as viewed in FIG. 9) portion of body 112d and withdraw it, the second stress concentrating area, as depicted by dimension 160, would fail causing yet another portion of body 112d to still remain within the hole and further inwardly thereof making any further attempts at withdrawal even more difficult.

Although only one preferred embodiment and selected modifications of the invention have been disclosed and described, it is apparent that other embodiments and modifications of the inventions are possible within the scope of the appended claims.

I claim:

1. A fuel metering system effective for metering the rate of fuel flow to an associated combustion engine, comprising body means, conduit means formed in said body means communicating with a source of fuel, orifice means formed generally in said body means for receiving fuel from said conduit means and discharging said fuel into induction passage means associated with said engine, an opening formed in said body means, said opening receiving adjustably positionable valve means, said valving means being selectively adjustably positionable with respect to said orifice means in order to thereby cooperate with said orifice means in order to cooperatingly define an effective metering area for metering said rate of said fuel flow from said conduit means and to said induction passage means, and closure means fitted into said opening as to effectively close said opening to access to said valving means, said closure means comprising stress localizing means effective to cause a structural failure at at least one preselected location in said closure means when an attempt is made to withdraw said closure means from said opening.

2. A fuel metering system according to claim 1 wherein said closure means comprises a closure member having at least portions thereof relatively resiliently deflectable generally toward said closure member when said closure member is being inserted into said opening, said portions thereof being relatively resiliently deflectable generally away from said closure member when said closure member is attempted to be withdrawn from said opening.

3. A fuel metering system according to claim 2 wherein the medial axis of said opening and said closure member is inclined with respect to the horizontal as to have said closure member positioned substantially generally lower than said valving means and said orifice means.

4. A fuel metering system according to claim 2 wherein said closure means comprises relatively resiliently deflectable plastic material.

5. A fuel metering system according to claim 2 wherein said opening comprises a threaded hole, and wherein said portions of said closure means operatively engage the threaded portion of said threaded hole.

6. A fuel metering system according to claim 5 wherein said valving means comprises an externally threaded needle-like valve threadably engagable with said threaded portion of said threaded hole whereby axial adjustment of the needle-like valve relative to said orifice means is accomplished by threadable rotation of said needle-like valve within said threaded portion.

7. A fuel metering system according to claim 6 and further comprising means for frictionally holding said needle-valve in its adjusted position relative to said orifice means.

8. A fuel metering system according to claim 2 wherein said closure member comprises a main body insertable into said opening, and wherein said portions thereof comprise a plurality of annular flange-like portions spaced from each other and carried by said main body as to be radiating outwardly therefrom.

9. A fuel metering system according to claim 8 wherein said closure member further comprises a head portion, said head portion being carried by said main body and being of a size greater than that which may be accomodated by said opening.

10. A fuel metering system according to claim 9 wherein said head portion when viewed in axial projection has a rectilinear configuration.

11. A fuel metering system according to claim 9 and further comprising recess means carried by said body means, said recess means being of a size to closely receive said head portion therein.

12. A fuel metering system according to claim 11 wherein said recess means comprises a generally cylindrical configuration.

13. A fuel metering system according to claim 12 wherein said recess means comprises a slot-like configuration.

14. A fuel metering system effective for metering the rate of fuel flow to an associated combustion engine, comprising body means, conduit means formed in said body means communicating with a source of fuel, orifice means formed generally in said body means for receiving fuel from said conduit means and discharging said fuel into induction passage means associated with said engine, an opening formed in said body means, said opening receiving adjustably positionable valve means, said valving means being selectively adjustably positionable with respect to said orifice means in order to thereby cooperate with said orifice means in order to cooperatingly define an effective metering area for metering said rate of said fuel flow from said conduit means and to said induction passage means, and closure means fitted into said opening as to effectively close said opening to access to said valving means, said closure means comprising a closure member having at least portions thereof relatively resiliently deflectable generally toward said closure member when said closure member is being inserted into said opening, said portions thereof being relatively resiliently deflectable generally away from said closure member when said closure member is attempted to be withdrawn from said opening, said closure means further comprising stress localizing means effective to cause a structural failure at at least one preselected location in said closure means when an attempt is made to withdraw said closure means from said opening.

* * * * *